(12) United States Patent
Kim et al.

(10) Patent No.: US 12,466,467 B2
(45) Date of Patent: Nov. 11, 2025

(54) GEAR HOUSING AND ELECTRIC ASSIST DEVICE

(71) Applicant: NSK STEERING & CONTROL, INC., Tokyo (JP)

(72) Inventors: Hansol Kim, Maebashi (JP); Yoshifumi Kurokawa, Maebashi (JP); Kittipon Roongvashira, Maebashi (JP)

(73) Assignee: NSK STEERING & CONTROL, INC., Tokyo (JP)

(*) Notice: Subject to any disclaimer, the term of this patent is extended or adjusted under 35 U.S.C. 154(b) by 0 days.

(21) Appl. No.: 18/703,087

(22) PCT Filed: Oct. 6, 2022

(86) PCT No.: PCT/JP2022/037387
§ 371 (c)(1),
(2) Date: Apr. 19, 2024

(87) PCT Pub. No.: WO2023/074304
PCT Pub. Date: May 4, 2023

(65) Prior Publication Data
US 2024/0416989 A1     Dec. 19, 2024

(30) Foreign Application Priority Data
Oct. 25, 2021 (JP) .................. 2021-173749

(51) Int. Cl.
  *B62D 5/04*      (2006.01)
  *F16H 57/03*     (2012.01)
  *F16H 57/039*    (2012.01)

(52) U.S. Cl.
  CPC ......... B62D 5/0403 (2013.01); B62D 5/0454 (2013.01); F16H 57/03 (2013.01); F16H 57/039 (2013.01)

(58) Field of Classification Search
  CPC ..... B62D 5/0403; B62D 5/0454; F16H 57/03; F16H 57/039
  See application file for complete search history.

(56) References Cited

U.S. PATENT DOCUMENTS 5,287,770 A * 2/1994 Mudd ................. F16H 57/039
                                              74/606 R
6,431,026 B1 * 8/2002 Walther ................ H02K 11/40
                                              74/606 R
(Continued)

FOREIGN PATENT DOCUMENTS

JP  2006-311657 A   11/2006
JP  2017-024702 A   2/2017
(Continued)

OTHER PUBLICATIONS

International Search Report of PCT/JP2022/037387 dated Jan. 10, 2023 [PCT/ISA/210].

*Primary Examiner* — Thomas C Diaz
(74) *Attorney, Agent, or Firm* — Sughrue Mion, PLLC

(57) ABSTRACT

The gear housing including a wheel housing section, a worm housing section, and a one side rib that protrudes from a side surface on one side in the axial direction of a bottom portion for wheel of the wheel housing section and connects a fitting tubular portion for wheel of the wheel housing section and a fitting tubular portion for worm on one side in the axial direction of the worm housing section into which a bearing for worm or a bearing holder holding the bearing for worm is internally fitted.

8 Claims, 17 Drawing Sheets

(56) References Cited

U.S. PATENT DOCUMENTS

| | | | | |
|---|---|---|---|---|
| 10,400,881 B1* | 9/2019 | Ramirez Ortiz | ...... | F16H 57/021 |
| 10,882,549 B2* | 1/2021 | Hiramoto | ............. | B62D 5/0403 |
| 11,377,138 B2* | 7/2022 | Ishii | ......................... | B22C 9/24 |
| 2001/0026105 A1* | 10/2001 | Torii | ..................... | F16H 57/039 |
| | | | | 310/75 R |
| 2016/0369883 A1* | 12/2016 | Chang | ...................... | F16H 1/16 |

FOREIGN PATENT DOCUMENTS

| | | |
|---|---|---|
| WO | 2016/084659 A1 | 6/2016 |
| WO | 2019/087945 A1 | 5/2019 |

\* cited by examiner

GEAR HOUSING AND ELECTRIC ASSIST DEVICE

CROSS REFERENCE TO RELATED APPLICATIONS

This application is a National Stage of International Application No. PCT/JP2022/037387 filed on Oct. 6, 2022, claiming priority based on Japanese Patent Application No. 2021-173749 filed on Oct. 25, 2021.

TECHNICAL FIELD

The present disclosure relates to an electric assist device and a gear housing of the electric assist device.

BACKGROUND ART

Electric power steering devices equipped with an electric assist device for applying auxiliary power to a steering force transmission path is widely used as a device for reducing the force required for operation of steering wheel when applying a steering angle to the steered wheel of an automobile.

Electric power steering devices are roughly classified in structure depending on the mounting position of the electric assist device. Specifically, various structures have been proposed, such as a column assist type that applies auxiliary power to the steering shaft rotatably supported inside the steering column, a pinion assist type that applies auxiliary power to the pinion shaft that is an input shaft of the steering gear unit, and a dual pinion type in which the steering gear unit is provided with another pinion shaft separate from the pinion shaft that is the input shaft and applies auxiliary power to the separate pinion shaft.

In either structure, the electric assist device includes an electric motor serving as a power source and a reduction gear, and applies auxiliary power from the electric motor to a shaft member that rotates or moves linearly due to the operation of the steering wheel through the reduction gear. As such as reduction gear, a worm reduction gear is widely used.

The worm reduction gear includes a worm wheel and a worm that is rotationally driven by an electric motor. The worm wheel has wheel teeth on the outer circumferential surface. The worm has worm teeth that mesh with the wheel teeth on the outer circumferential surface. The worm wheel and the worm are accommodated inside the gear housing. The gear housing includes a wheel housing section that accommodates a worm wheel inside, and a worm housing section that accommodates a worm inside. The worm housing section is arranged at a skewed position with respect to the wheel housing section, and is connected to a portion in the circumferential direction at an end portion on the outer side in the radial direction of the wheel housing section. The worm wheel is rotatably supported inside the wheel housing section by a bearing for wheel. The worm is rotatably supported inside the worm housing section by a bearing for worm.

The electric motor is supported at an end portion on one side in the axial direction of the worm housing section, and rotationally drives the worm during use. In other words, the electric assist device increases torque by transmitting auxiliary power generated by the electric motor to the worm wheel through the worm and applies it to a shaft member that rotates or moves linearly due to the operation of the steering wheel so as to reduce power required for the operator to operate the steering wheel.

In the electric assist device, when auxiliary power is generated, a meshing reaction force is applied from a meshing portion between the worm teeth and the wheel teeth to the worm and the worm wheel. Further, the meshing reaction force is transmitted to the worm housing section through a bearing for worm for rotatably supporting the worm inside the worm housing section, and is transmitted to the wheel housing section through a bearing for wheel for rotatably supporting the worm wheel inside the wheel housing section. As a result, a force in a direction separating the worm housing section and the wheel housing section from each other and a force in a direction that they are twisted relative to each other, are applied to the gear housing.

WO 2019/087945 (A1) discloses a structure in which a gear housing is provided with a rib, and a worm housing section and a wheel housing section are connected by the rib.

CITATION LIST

Patent Literature

Patent Literature 1: WO 2019/087945 (A1)

SUMMARY OF THE INVENTION

Technical Problem

In the structure described in WO 2019/087945 (A1), the rib provided in the gear housing connects the worm housing section and the wheel housing section, therefore, it is possible to suppress deformation of the gear housing due to the force in a direction separating the worm housing section and the wheel housing section from each other and the force in a direction that they are twisted relative to each other, acting on the gear housing when auxiliary torque is generated.

However, in the structure described in WO 2019/087945 (A1), the positions of the ribs are determined in consideration of improving the fluidity of the material when manufacturing the gear housing by casting or injection molding. As a result, there is room for improvement in terms of more effectively suppressing deformation of the gear housing by the ribs provided in the gear housing.

The object of the present disclosure is to provide a gear housing capable of effectively suppressing deformation during use, and an electric assist device including the gear housing.

Solution to Problem

The gear housing according to one aspect of the present disclosure includes a wheel housing section that accommodates a worm wheel inside, and a worm housing section that accommodates a worm inside.

The wheel housing section has a tubular portion for wheel arranged around the worm wheel, a circular bottom portion for wheel extending from an end portion of the tubular portion for wheel on one side in an axial direction of the wheel housing section toward an inner side in a radial direction, and a fitting tubular portion for wheel that is connected to an end portion on the inner side in the radial direction of the bottom portion for wheel and into which a bearing for wheel for supporting the worm wheel is internally fitted.

The worm housing section has a tubular shape with at least an end portion on one side in an axial direction of the worm housing section is open, has a center axis that is arranged at a skewed position with respect to a center axis of the wheel housing section, and is connected to a portion in a circumferential direction of an end portion on an outer side in the radial direction of the wheel housing section. The worm housing section has fitting tubular portions for worm at two locations separated in the axial direction of the worm housing section into which a bearing for worm for supporting the worm or a bearing holder holding the bearing for worm is internally fitted.

The gear housing according to one aspect of the present disclosure includes a one side rib that protrudes from a side surface of the bottom portion for wheel on the one side in the axial direction of the wheel housing section and connects the fitting tubular portion for wheel and a fitting tubular portion for worm on the one side in the axial direction of the worm housing section of the fitting tubular portions for worm at two locations.

In the gear housing according to one aspect of the present disclosure, the one side rib extends in a radial direction centered on a center axis of the bottom portion for wheel.

In the gear housing according to one aspect of the present disclosure, the one side rib is arranged on a straight line that connects the center axis of the bottom portion for wheel and a center point of the fitting tubular portion for worm on the one side in the axial direction of the worm housing section when viewed from the one side in the axial direction of the wheel housing section.

The gear housing according to one aspect of the present disclosure includes an other side rib that protrudes from a side surface of the bottom portion for wheel on the one side in the axial direction of the wheel housing section and connects the fitting tubular portion for wheel and a fitting tubular portion for worm on the other side in the axial direction of the worm housing section of the fitting tubular portion for worm at two locations.

In the gear housing according to one aspect of the present disclosure, the other side rib extends in the radial direction centered on the center axis of the bottom portion for wheel.

In the gear housing according to one aspect of the present disclosure, the other side rib is arranged on a straight line that connects the center axis of the bottom portion for wheel and a center point of the fitting tubular portion for worm on the other side in the axial direction of the worm housing section when viewed from the one side in the axial direction of the bottom portion for wheel.

In the gear housing according to one aspect of the present disclosure, an end portion on the other side in the axial direction of the worm housing section is also open, and a width dimension in the circumferential direction of the other side rib is larger than a width dimension in the circumferential direction of the one side rib.

In the gear housing according to one aspect of the present disclosure, an end portion on the other side in the axial direction of the worm housing section is also open, an end portion on an outer side in the radial direction of the other side rib is located farther from the fitting tubular portion for wheel in a direction orthogonal to the axial direction of the worm housing section than an end portion on an outer side in the radial direction of the one side rib.

The electric assist device of one aspect of the present disclosure includes a worm wheel having wheel teeth on an outer circumferential surface, a worm having worm teeth on an outer circumferential surface that mesh with the wheel teeth, a gear housing accommodating the worm wheel and the worm inside, and an electric motor supported by the gear housing and rotationally driving the worm, and the gear housing is configured by the gear housing according to one aspect of the present disclosure.

The structure of the present disclosure may be implemented by optionally combining the respective aspects described above to the extent that no contradiction occurs.

Effect of Invention

According to one aspect of the present disclosure, it is possible to provide a gear housing that can effectively suppress deformation during use, and an electric assist device provided with the gear housing.

DESCRIPTION OF THE EMBODIMENTS

Example 1

FIG. 1 to FIG. 6 illustrate a first example of an embodiment of the present disclosure. In this example, an electric assist device of one aspect of the present disclosure is applied to a column assist type electric power steering device. However, the electric assist device of the present disclosure can also be applied to a pinion assist type or dual pinion type electric power steering device.

Figure 1:
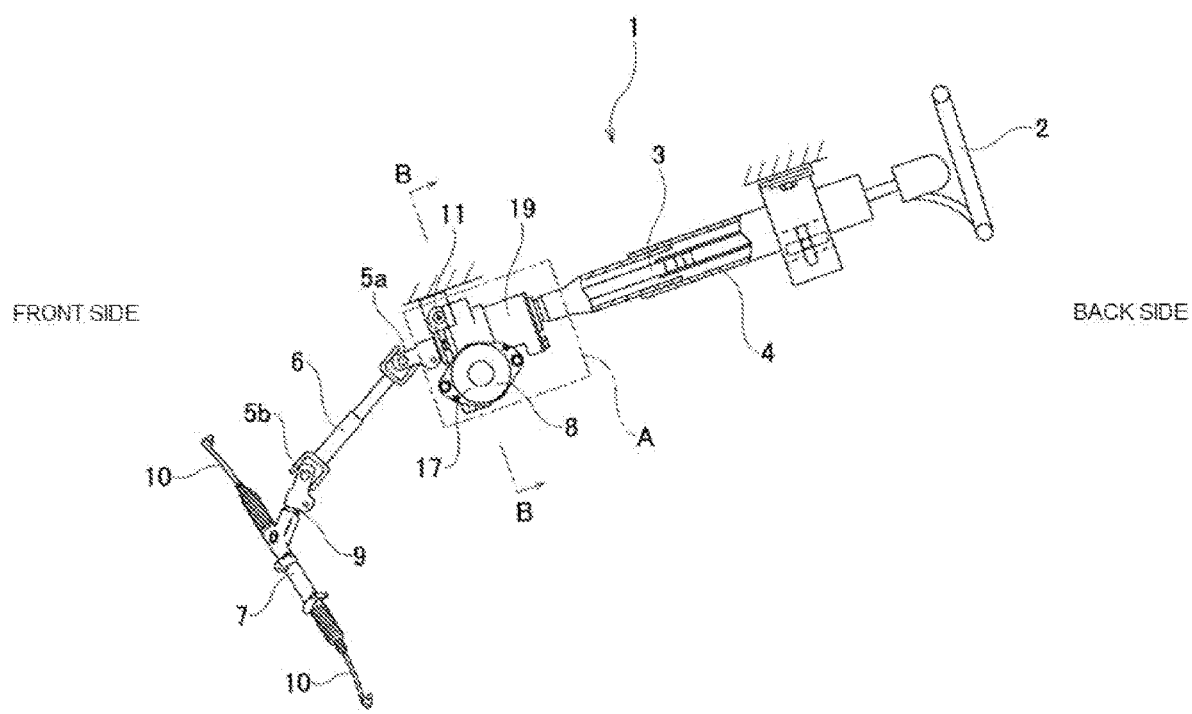
FIG. 1 is a side view in partial cross section of an electric power steering device of a first example of an embodiment of the present disclosure.

As illustrated in FIG. 1, the electric power steering device 1 of this example includes a steering wheel 2, a steering shaft 3, a steering column 4, a pair of universal joints 5a, 5b, an intermediate shaft 6, a steering gear unit 7, and an electric assist device 8.

In the following description regarding the electric power steering device 1, the forward-backward direction is the forward-backward direction of a vehicle, and the left-right direction is the width direction of the vehicle.

The steering wheel 2 is supported and fixed to the rear end portion of the steering shaft 3. The steering shaft 3 is rotatably supported inside the steering column 4 that is supported by a vehicle body. The front end portion of the steering shaft 3 is connected to a pinion shaft 9 of the steering gear unit 7 through a rear-side universal joints 5*a*, an intermediate shaft 6, and a front-side universal joint 5*b*. Therefore, when the driver rotates the steering wheel 2, the rotation of the steering wheel 2 is transmitted to the pinion shaft 9 through the steering shaft 3, the pair of universal joints 5*a*, 5*b*, and the intermediate shaft 6. The rotation of the pinion shaft 9 is converted into linear motion of a rack shaft (not illustrated) of the steering gear unit 7 engaged with the pinion shaft 9. As a result, the pair of tie rods 10 are pushed and pulled, and a steering angle is applied to the left and right steered wheels according to the amount of operation of the steering wheel 2.

The electric power steering device 1 of this example includes a tilt mechanism for adjusting the up-down position of the steering wheel 2 in accordance with the size and operating posture of the operator. Due to this, the electric assist device 8 fixed to the front end portion of the steering column 4 is supported with respect to the vehicle body so as to pivotally displace around a tilt shaft 11 in the left-right direction. The up-down position of the steering wheel 2 is adjusted by swinging the steering shaft 3, the steering column 4, and the electric assist device 8 in the vertical direction about the tilt shaft 11.

Figure 2:
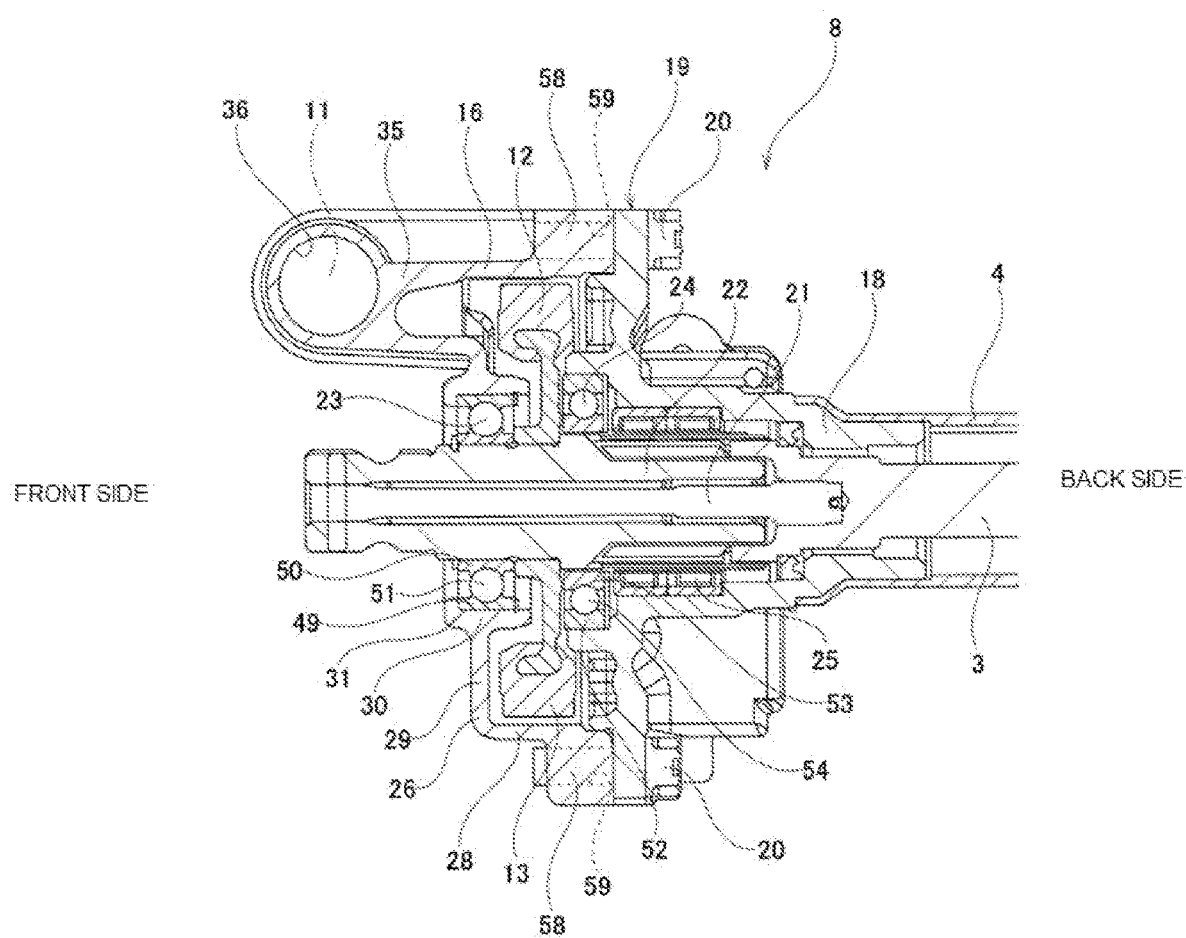
FIG. 2 is a cross-sectional view of portion A in FIG. 1.
Figure 3:
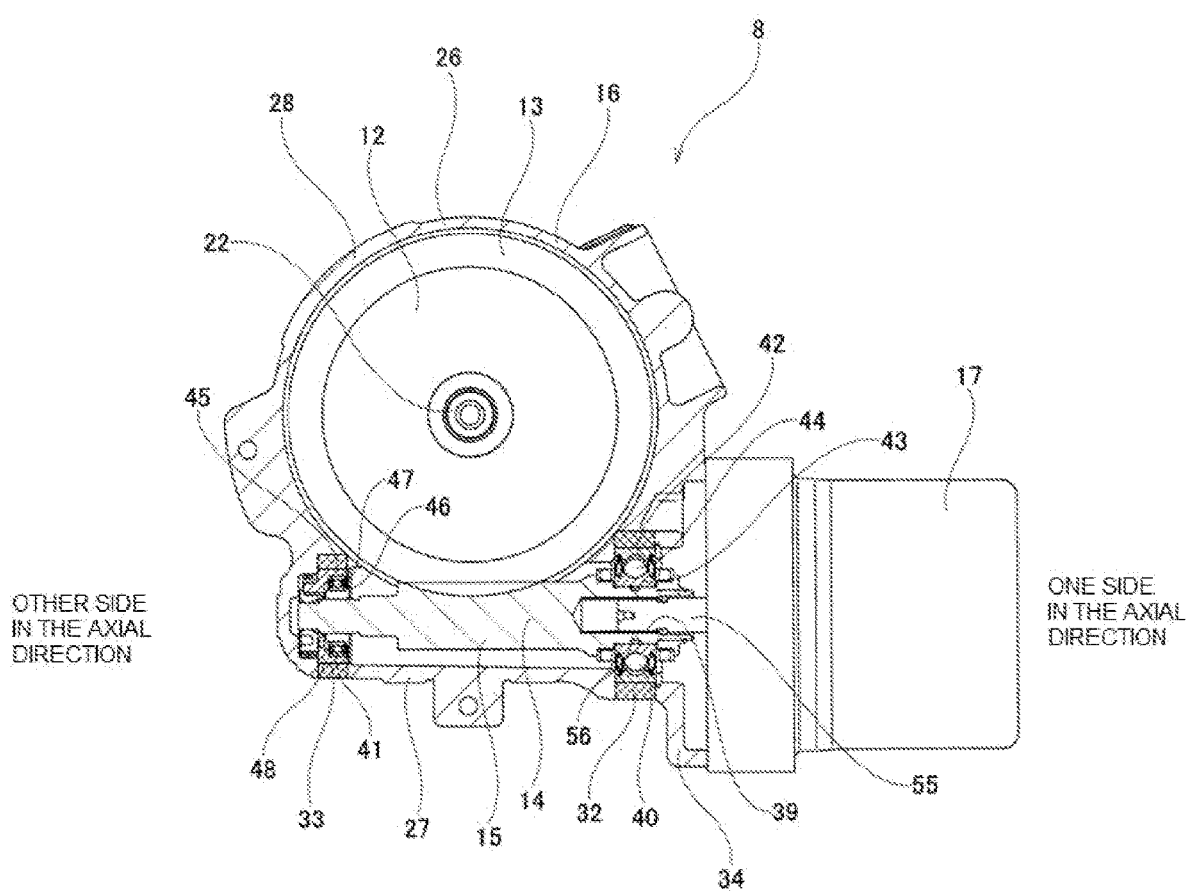
FIG. 3 is a cross-sectional view of section B-B in FIG. 1.

As illustrated in FIG. 2 and FIG. 3, the electric assist device 8 includes a worm wheel 12 having wheel teeth 13 on the outer circumferential surface, a worm 14 having worm teeth 15 on the outer circumferential surface that engage with the wheel teeth 13, a gear housing 16 that accommodates the worm wheel 12 and the worm 14 inside, and an electric motor 17 that is supported by the gear housing 16 and rotationally drives the worm 14.

As illustrated in FIG. 2, the electric power steering device 1 of this example further includes a sensor housing 18 fixed to the front end portion of the steering column 4. In this example, the housing 19 is formed by connecting the gear housing 16 arranged on the front side and the sensor housing 18 arranged on the rear side in the forward-backward direction with a plurality of bolts 20.

The electric power steering device 1 of this example further includes a torsion bar 21 and an output shaft 22. In this example, the front end portion of the steering shaft 3 is inserted on the inside of the housing 19 and connected to the output shaft 22 through the torsion bar 21. The front end portion of the output shaft 22 protrudes toward the front side from the inside of the housing 19 and is connected to the intermediate shaft 6 through the rear-side universal joint 5*a* (see FIG. 1). The output shaft 22 is rotatably supported by ball bearings 23, 24 with respect to the housing 19 at two locations separated in the axial direction.

The electric power steering device 1 of this example further includes a torque sensor 25 accommodated inside the sensor housing 18 and arranged around the output shaft 22. The torque sensor 25 detects the direction and magnitude of torque applied from the steering wheel 2 to the steering shaft 3. The electric motor 17 rotationally drives the worm 14 based on, for example, the detected signal from the torque sensor 25 and the vehicle speed signal output from the vehicle speed sensor assembled in the transmission so as to apply auxiliary power to the output shaft 22 through the worm wheel 12. As a result, the force required for the driver to rotate the steering wheel 2 is reduced.

The gear housing 16, worm 14, worm wheel 12, and electric motor 17 of the electric assist device 8 of this example will be further explained below.

Figure 4:
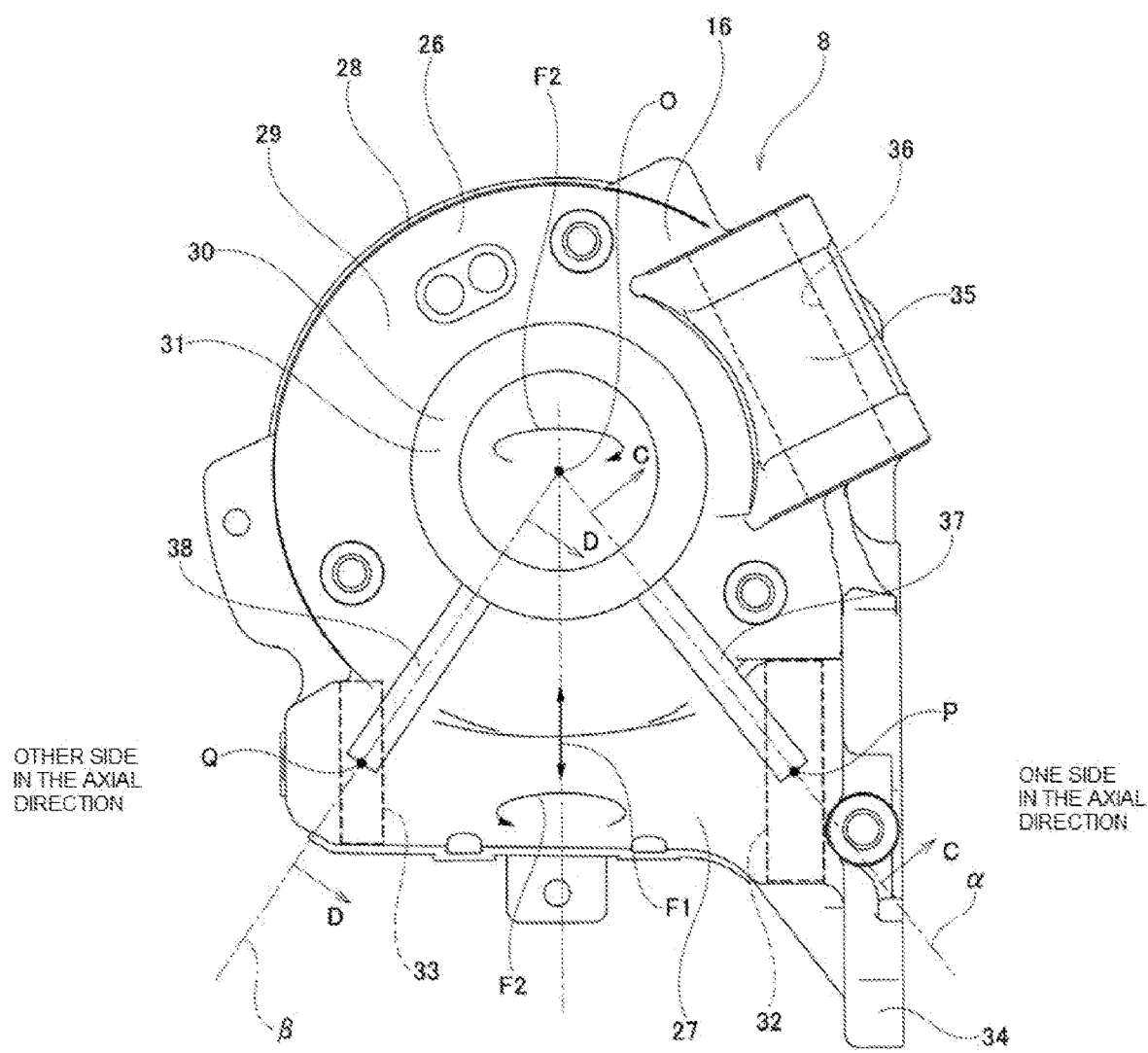
FIG. 4 is a view of a gear housing of the first example as viewed from the front side in the axial direction.

As illustrated in FIG. 2 to FIG. 4, the gear housing 16 includes a wheel housing section 26 that accommodates the worm wheel 12 inside and a worm housing section 27 that accommodates the worm 14 inside. In this example, the gear housing 16 is made of a thermoplastic resin or a light alloy such as an aluminum alloy so as to be integrally configured as a whole. That is, the connections between parts of the gear housing 16 of this example, which will be explained below, mean integral connections, in other words, physically continuous connections. The gear housing 16 can be formed, for example, by injection molding of thermoplastic resin or die casting of a light alloy such as an aluminum alloy.

In this example, the wheel housing section 26 has a cylindrical tubular portion for wheel 28 arranged around the worm wheel 12, a circular bottom portion for wheel 29 extending from an end portion of the tubular portion for wheel 28 on the front side corresponding to one side in the axial direction of the wheel housing section 26 toward the inner side in the radial direction, and a substantially cylindrical fitting tubular portion for wheel 30 connected to an end portion on the inner side in the radial direction of the bottom portion for wheel 29. Here, in the following description regarding the wheel housing section 26 and the components, the axial direction means the axial direction of the wheel housing section 26 and each of the components. In this example, the end portion on the inner side in the radial direction of the bottom portion for wheel 29 is connected to an intermediate portion in the axial direction of the fitting tubular portion for wheel 30. In this example, an annular rib 31 is formed by a portion of the fitting tubular portion for wheel 30 that protrudes further toward the front side than the side surface on the front side of the bottom portion for wheel 29. In this example, in a state where the housing 19 is formed by combining the gear housing 16 and the sensor housing 18, an end portion on the front side of the sensor housing 18 is internally fitted into an end portion on the rear side of the tubular portion for wheel 28, and an end surface on the front side of the sensor housing 18 abuts an end surface on the rear side of the tubular portion for wheel 28.

In this example, the worm housing section 27 is formed into a bottomed tubular shape where an end portion on the one side in the axial direction (right side in FIG. 3 and FIG. 4) of the worm housing section 27 to which the electric motor 17 is attached is open and the end portion on the other side in the axial direction (left side in FIG. 3 and FIG. 4) is closed. Here, in the following description regarding the worm housing section 27 and the components, the axial direction means the axial direction of the worm housing section 27 and each of the components. However, in a case of implementing a configuration of the present disclosure, the worm housing section may be formed into a tubular shape where the end portion on the one side in the axial direction and the end portion on the other side in the axial direction are both open, and the opening at the end portion on the other side in the axial direction may be closed with a lid. The worm housing section 27 is connected to a portion in the circumferential direction of an end portion on the outer side in the radial direction of the wheel housing section 26. The center axis of the worm housing section 27 is arranged at a skewed position with respect to the center axis of the wheel housing section 26. The internal space of the worm housing section 27 communicates with the internal space of the wheel housing section 26.

In this example, the worm housing section 27 has substantially cylindrical fitting tubular portions for worm 32, 33 at two locations separated in the axial direction, specifically, at end portions on both sides in the axial direction, more specifically, in portions marked with diagonal grids in FIG. 3 and in portions surrounded by chain lines in FIG. 4. Each of the fitting tubular portions for worm 32, 33 is a portion into which a bearing for worm for supporting the worm 14 with respect to the worm housing section 27 or a bearing holder holding the bearing for worm is internally fitted. In this example, the fitting tubular portion for worm 32 on the one side in the axial direction has a larger inner-diameter dimension and a width dimension in the axial direction than the fitting tubular portion for worm 33 on the other side in the axial direction. In this example, the worm housing section 27 optionally and additionally has a motor mounting flange 34 extending toward the outer side in the radial direction at the end portion on the one side in the axial direction. The motor mounting flange 34 is a portion to which the electric motor 17 is attached, and has a function of increasing the rigidity of the peripheral portion of the electric motor 17.

In this example, the gear housing 16 optionally and additionally further includes a hinge portion 35. The hinge portion 35 protrudes toward the front side from a portion of an end portion on the outer side in the radial direction of the wheel housing section 26 that is separated from the worm housing section 27 in the circumferential direction. The hinge portion 35 has an insertion hole 36 for inserting the tilt shaft 11 (see FIG. 1). In this example, as illustrated in FIG. 4, the hinge portion 35 is arranged at a position closer to the one side in the axial direction of the wheel housing section 26. In a case of implementing a configuration of the present disclosure, the position of the hinge portion 35 in the circumferential direction of the wheel housing section 26 may be different from that of this example as long as it is separated from the worm housing section 27.

In this example, the gear housing 16 optionally and additionally further includes coupling flanges 58 that protrude toward the outer side in the radial direction from two locations on opposite sides in the radial direction of the tubular portion for wheel 28. Each of the coupling flanges 58 has a bolt hole 59 for screwing or inserting the bolts 20 (see FIG. 2) for coupling the gear housing 16 and the sensor housing 18. In this example, one coupling flange 58 of the two coupling flanges 58 (one on the upper side in FIG. 2) is arranged at the same position in the circumferential direction as the hinge portion 35. In a case of implementing a configuration of the present disclosure, the number and the phase of the arrangement in the circumferential direction of the coupling flange may be different from those of this example.

In this example, the gear housing 16 further includes a one side rib 37. The one side rib 37 protrudes from the side surface on the front side which is the one side in the axial direction of the bottom portion for wheel 29 and from the side surface on the front side of the worm housing section 27, and connects the fitting tubular portion for wheel 30 and the fitting tubular portion for worm 32 on the one side in the axial direction of the two fitting tubular portions for worm 32, 33.

Figure 5:
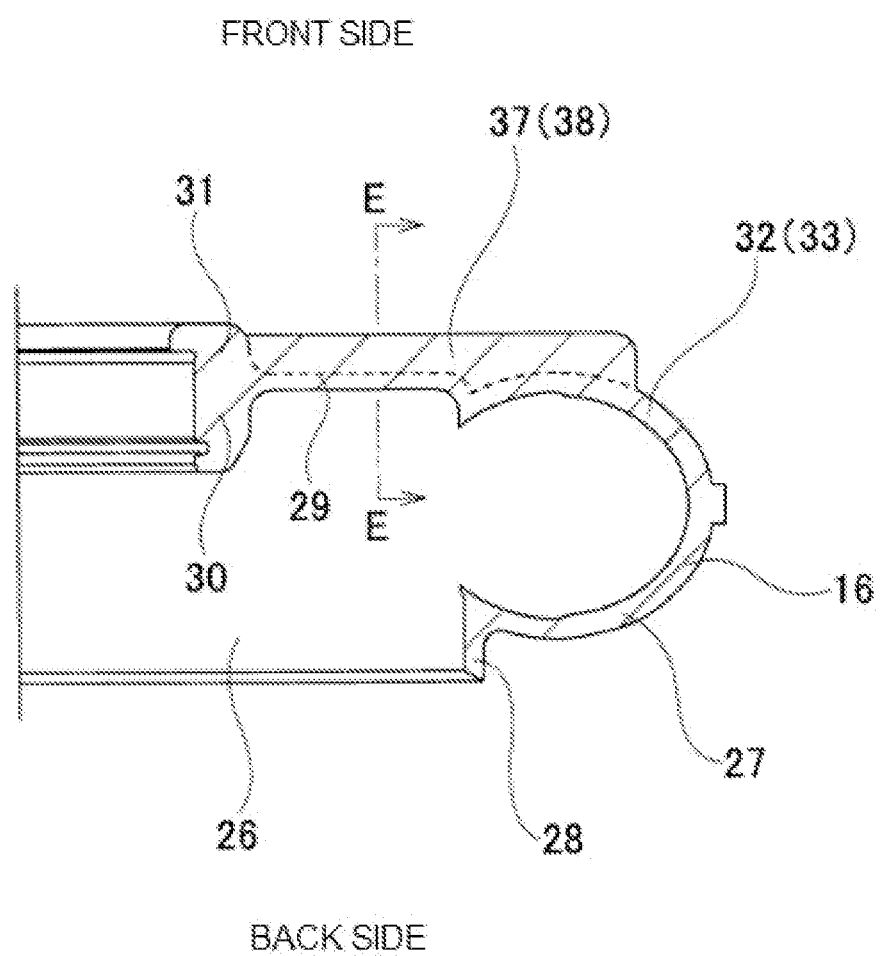
FIG. 5 is a cross-sectional view of section C-C and section D-D in FIG. 4.

In a case of implementation of a configuration of the present disclosure, the amount of protrusion toward the front side of the one side rib 37 can be set to an arbitrary magnitude. In this example, as illustrated in FIG. 5, the front-side end portion of the one side rib 37 is positioned slightly rearward than the front-side end portion of the annular rib 31 by adjusting the amount of protrusion.

In this example, as illustrated in FIG. 4, the one side rib 37 extends in the radial direction centered on the center axis O of the bottom portion for wheel 29. The center axis O of the bottom portion for wheel 29 is also the center axis of the wheel housing section 26. The end portion on the inner side in the radial direction of the one side rib 37 is connected to the outer circumferential surface of the annular rib 31. The end portion on the outer side in the radial direction of the one side rib 37 is connected to the side surface on the front side of the fitting tubular portion for worm 32 on the one side in the axial direction. In other words, the end portion on the outer side in the radial direction of the one side rib 37 is firmly connected to the outer circumferential surface of the fitting tubular portion for worm 32 on the one side in the axial direction so as to overlap in the axial direction of the bottom portion for wheel 29.

In a case of implementing a configuration of the present disclosure, the extension direction of the one side rib that connects the fitting tubular portion for wheel and the fitting tubular portion for worm on the one side in the axial direction may be different from the radial direction centered on the center axis of the bottom portion for wheel.

In a case of implementing a configuration of the present disclosure, the end portion on the outer side in the radial direction of the one side rib 37 may be located on the outer side in the radial direction or the inner side in the radial direction than in the case of this example as long as it is connected to the fitting tubular portion for worm 32 on the one side in the axial direction.

In this example, as illustrated in FIG. 4, the one side rib 37 is arranged on a straight line α connecting the center axis O of the bottom portion for wheel 29 and the center point P of the fitting tubular portion for worm 32 on the one side in the axial direction when viewed from the front side of the bottom portion for wheel 29. In other words, in this example, the one side rib 37 extends in the direction of straight line α.

In a case of implementing a configuration of the present disclosure, when the extension direction of the one side rib is the radial direction centered on the center axis of the bottom portion for wheel, the extension direction may also be a direction shifted by an arbitrary angle with respect to the direction of the straight line α.

Figure 6:
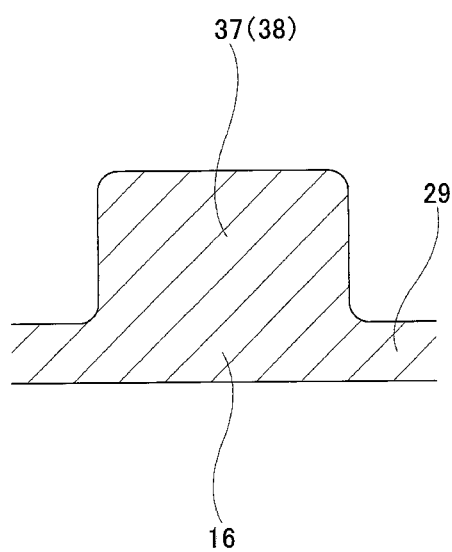
FIG. 6 is a cross-sectional view of section E-E in FIG. 5.

In this example, the cross-sectional shape of the one side rib 37, specifically, the cross-sectional shape cut along an imaginary flat plane orthogonal to the extension direction is a solid rectangular shape, as illustrated in FIG. 6. However, in a case of implementing a configuration of the present disclosure, the cross-sectional shape may be an arbitrary shape.

In this example, the gear housing 16 further includes the other side rib 38. The other side rib 38 protrudes from the side surface on the front side of the bottom portion for wheel 29 and from the side surface on the front side of the worm housing section 27, and connects the fitting tubular portion for wheel 30 and the fitting tubular portion for worm 33 on the other side in the axial direction of the two fitting tubular portions for worm 32, 33.

In a case of implementing a configuration of the present disclosure, the amount of protrusion toward the front side of the other side rib 38 can be set to an arbitrary magnitude. In this example, as illustrated in FIG. 5, the front-side end portion of the other side rib 38 is positioned slightly rearward than the front-side end portion of the annular rib 31 by adjusting the amount of protrusion.

In this example, as illustrated in FIG. 4, the other side rib 38 extends in the radial direction centered on the center axis O of the bottom portion for wheel 29. The end portion on the inner side in the radial direction of the other side rib 38 is connected to the outer circumferential surface of the annular rib 31. The end portion on the outer side in the radial direction of the other side rib 38 is connected to the side surface on the front side of the fitting tubular portion for worm 33 on the other side in the axial direction. In other words, the end portion on the outer side in the radial direction of the other side rib 38 is firmly connected to the outer circumferential surface of the fitting tubular portion for worm 33 on the other side in the axial direction so as to overlap in the axial direction of the bottom portion for wheel 29.

In a case of implementing a configuration of the present disclosure, the extension direction of the other side rib that connects the fitting tubular portion for wheel and the fitting tubular portion for worm on the other side in the axial direction may be different from the radial direction centered on the center axis of the bottom portion for wheel.

In a case of implementing a configuration of the present disclosure, the end portion on the outer side in the radial direction of the other side rib 38 may be located on the outer side in the radial direction or on the inner side in the radial direction than in the case of this example as long as it is connected to the fitting tubular portion for worm 33 on the other side in the axial direction.

In this example, as illustrated in FIG. 4, the other side rib 38 is arranged on a straight line β connecting the center axis O of the bottom portion for wheel 29 and the center point Q of the fitting tubular portion for worm 33 on the other side in the axial direction when viewed from the front side of the bottom portion for wheel 29. In other words, in this example, the other side rib 38 extends in the direction of the straight line ß.

In a case of implementing a configuration of the present disclosure, when the extension direction of the other side rib is the radial direction centered on the center axis of the bottom portion for wheel, the extension direction may also be a direction shifted by an arbitrary angle with respect to the direction of the straight line ß.

In this example, the cross-sectional shape of the other side rib 38, specifically, the cross-sectional shape cut along an imaginary flat plane orthogonal to the extension direction is a solid rectangular shape, as illustrated in FIG. 6. However, in a case of implementing a configuration of the present disclosure, the cross-sectional shape may be an arbitrary shape. In this example, the height in the axial direction and the width in the circumferential direction of the one side rib 37 and the other side rib 38 are made approximately equal to each other, but in a case of implementing a configuration of the present disclosure, the height in the axial direction and the width in the circumferential direction of the one side rib may be larger than those of the other side rib.

In this example, as illustrated in FIG. 3, the worm 14 has worm teeth 15 that mesh with the wheel teeth 13 on the outer circumferential surface of the intermediate portion in the axial direction, and has a female spline 39 on the inner circumferential surface of the end portion on the one side in the axial direction. The worm 14 is rotatably supported inside the worm housing section 27 by ball bearings 40, 41, each of which is a bearing for worm.

The ball bearing 40 includes an outer ring 42, an inner ring 43, and a plurality of balls 44. The outer ring 42 is internally fitted into the fitting tubular portion for worm 32 on the one side in the axial direction of the worm housing section 27. The inner ring 43 is externally fitted onto the end portion on the one side in the axial direction of the worm 14. In a case of implementing a configuration of the present disclosure, alternatively, the outer ring 42 may also be internally fitted into an annular bearing holder so as to hold the ball bearing 40 by the bearing holder, and the bearing holder may be internally fitted into the fitting tubular portion for worm 32 on the one side in the axial direction.

The ball bearing 41 includes an outer ring 45, an inner ring 46, and a plurality of balls 47. The ball bearing 41 is held in the bearing holder 48 by internally fitting the outer ring 45 into the annular bearing holder 48. The bearing holder 48 is internally fitted into the fitting tubular portion for worm 33 on the other side in the axial direction of the worm housing section 27. The inner ring 46 is externally fitted onto the end portion on the other side in the axial direction of the worm 14. In a case of implementing a configuration of the present disclosure, alternatively, the outer ring 45 may also be directly internally fitted into the fitting tubular portion for worm 33 on the other side in the axial direction.

As illustrated in FIG. 2 and FIG. 3, the worm wheel 12 has wheel teeth 13 on the outer circumferential surface and is rotatably supported inside the wheel housing section 26. Due to this, in this example, the worm wheel 12 is externally fitted and fixed to a portion of the output shaft 22 located between two ball bearings 23, 24.

The ball bearing 23, which is a bearing for wheel, includes an outer ring 49, an inner ring 50, and a plurality of balls 51. The outer ring 49 is internally fitted into the fitting tubular portion for wheel 30 of the wheel housing section 26. The inner ring 50 is externally fitted onto a portion of the output shaft 22 adjacent to the front side of the worm wheel 12.

The ball bearing 24 includes an outer ring 52, an inner ring 53, and a plurality of balls 54. The outer ring 52 is internally fitted into the end portion on the front side of the sensor housing 18. The inner ring 53 is externally fitted onto a portion of the output shaft 22 adjacent to the rear side of the worm wheel 12.

In this example, the center axis of the worm 14 and the center axis of the worm wheel 12 are orthogonal to each other when viewed from a direction orthogonal to both the center axis of the worm 14 and the center axis of the worm wheel 12. In other words, in the gear housing 16, when viewed from a direction orthogonal to both the center axis of the worm housing section 27 and the center axis of the wheel housing section 26, the center axis of the worm housing section 27 and the center axis of the wheel housing section 26 are orthogonal to each other. However, in a case of implementing a configuration of the present disclosure, it is also possible to adopt a configuration in which the center axis of the worm 14 and the center axis of the worm wheel 12 intersect at an acute angle when viewed from a direction orthogonal to both the center axis of the worm 14 and the center axis of the worm wheel 12. In other words, in the gear housing 16, it is also possible to adopt a configuration in which the center axis of the worm housing section 27 and the center axis of the wheel housing section 26 intersect at an acute angle when viewed from a direction orthogonal to both the center axis of the worm housing section 27 and the center axis of the wheel housing section 26.

In this example, as illustrated in FIG. 3, the electric motor 17 is coupled and fixed to the motor mounting flange 34 of the worm housing section 27 with bolts (not illustrated). In this example, the electric motor 17 has a male spline 56 on the outer circumferential surface of the tip end portion of the output shaft 55. By engaging the male spline 56 with the female spline 39 of the worm 14, the output shaft 55 and the worm 14 are connected so as to transmit torque. In a case of implementing a configuration of the present disclosure, the method of connecting the output shaft and the worm so as to transmit torque is not particularly limited. Fr example, it is also possible to connect the output shaft and the worm so as to transmit torque through a coupling that can absorb (allow) mutual misalignment.

According to the electric assist device 8 of this example, deformation of the gear housing during use can be effectively suppressed.

In other words, in the electric assist device 8 of this example, when auxiliary power is generated, a meshing reaction force is applied to the worm 14 and the worm wheel 12 from the meshing portion between the worm teeth 15 and the wheel teeth 13. Further, this meshing reaction force is transmitted to the worm housing section 27 through the ball bearings 40, 41, and to the wheel housing section 26 through the ball bearing 23. As a result, a force F1 in a direction that causes the worm housing section 27 and the wheel housing section 26 to separate from each other, and a force F2 in a direction that twists the worm housing section 27 and the wheel housing section 26 from each other are applied to the gear housing 16 (see FIG. 4). The force F2 in the mutually twisting direction is generated based on the fact that, of the worm teeth 15 and the wheel teeth 13, at least the worm teeth 15 has a lead angle. Further, the direction of the force F2 in the mutually twisting direction is reversed depending on the direction of rotation of the worm 14.

The gear housing 16 tends to be elastically deformed so as to be stretched in the direction of the force F1 based on the force F1 in the direction of separating from each other.

Further, the gear housing 16 tends to be elastically deformed so as to be stretched approximately in the direction of the straight line α or approximately in the direction of the straight line β in FIG. 4 based on the force F2 in the mutually twisting direction. In this case, the direction in which the gear housing 16 is stretched (approximately the direction of the straight line α, approximately the direction of the straight line β) is switched depending on the direction of rotation of the worm 14. Here, the approximate direction of the straight line α is an approximate direction connecting the annular rib 31 and the fitting tubular portion for worm 32 on the one side in the axial direction in FIG. 4, and does not necessarily coincide with the direction of the straight line α. Further, the approximate direction of the straight line β is an approximate direction connecting the annular rib 31 and the fitting tubular portion for worm 33 on the other side in the axial direction, and does not necessarily coincide with the direction of the straight line β.

In the structure of this example, the one side rib 37 is provided so as to connect the worm housing section 27 and the wheel housing section 26. As a result, the one side rib 37 can prevent the gear housing 16 from being elastically deformed so as to be stretched in the direction of the force F1 based on the force F1 in the direction of separating from each other.

Further, the one side rib 37 connects the fitting tubular portion for wheel 30 and the fitting tubular portion for worm 32 on the one side in the axial direction. The fitting tubular portion for wheel 30 has a larger thickness in the axial direction than a portion of the wheel housing section 26 surrounding the fitting tubular portion for wheel 30, and has a higher rigidity. Further, in the worm housing section 27, the fitting tubular portion for worm 32 on the one side in the axial direction is a portion where high rigidity is ensured for internally fitting the ball bearing 40, and/or, a portion where rigidity is increased due to the ball bearing 40 being internally fitted. In other words, the one side rib 37 connects the fitting tubular portion for wheel 30 of the wheel housing section 26 which is a portion with high rigidity and the fitting tubular portion for worm 32 on the one side in the axial direction of the worm housing section 27 which is a portion with high rigidity. Further, in FIG. 4, the extension direction of the one side rib 37 is approximately in the direction of the straight line α, more specifically, the direction of the straight line α. As a result, the one side rib 37 can effectively prevent the gear housing 16 from being elastically deformed so as to be stretched in the approximate direction of the straight line α based on the force F2 in the mutually twisting direction.

In the structure described in WO 2019/087945 (A1), the rib that connects the worm housing section and the wheel housing section is not connected to at least the fitting tubular portion for wheel. On the other hand, in the structure of this example, since the fitting tubular portion for wheel 30 and the fitting tubular portion for worm 32 on the one side in the axial direction are connected by the one side rib 37, it is possible to more effectively prevent the gear housing 16 from being elastically deformed so as to be stretched in the approximate direction of the straight line α.

In the structure of this example, the electric motor 17, which is a heavy object, is supported at the end portion on the one side in the axial direction of the worm housing section 27. When driving the electric motor 17, unavoidable motor vibration is generated. On the other hand, in the structure of this example, the fitting tubular portion for worm 32 on the one side in the axial direction, which is located near the electric motor 17, and the fitting tubular portion for wheel 30 are connected by the one side rib 37. That is, the rigidity of the gear housing 16 in the vicinity of the electric motor 17 can be increased by the one side rib 37. Accordingly, it becomes easy to ensure the support rigidity of the electric motor 17 by the gear housing 16 and the effect of suppressing motor vibration by the gear housing 16.

In the structure of this example, the other side rib 38 is provided so as to connect the worm housing section 27 and the wheel housing section 26. As a result, the other side rib 38 can prevent the gear housing 16 from being elastically deformed so as to be stretched in the direction of the force F1 based on the force F1 in the direction of separating from each other.

Further, the other side rib 38 connects the fitting tubular portion for wheel 30 and the fitting tubular portion for worm 33 on the other side in the axial direction. The fitting tubular portion for wheel 30 is a portion which has a larger thickness in the axial direction than a portion of the wheel housing section 26 surrounding the fitting tubular portion for wheel 30, and has a higher rigidity. Further, in the worm housing section 27, the fitting tubular portion for worm 33 on the other side in the axial direction is a portion where high rigidity is ensured for internally fitting the bearing holder 48, and/or, a portion where rigidity is increased due to the bearing holder 48 being internally fitted. In other words, the other side rib 38 connects the fitting tubular portion for wheel 30 of the wheel housing section 26 which is a portion with high rigidity and the fitting tubular portion for worm 33 on the other side in the axial direction of the worm housing section 27 which is a portion with high rigidity. Further, in FIG. 4, the extension direction of the other side rib 38 is approximately in the direction of the straight line β, more specifically, the direction of the straight line β. As a result, the other side rib 38 can effectively prevent the gear housing 16 from being elastically deformed so as to be stretched in the approximate direction of the straight line β based on the force F2 in the mutually twisting direction.

As described above, in the structure of this example, the rigidity of the gear housing 16 is ensured as a result of the one side rib 37 and the other side rib 38 connect the fitting tubular portion for wheel 30 located at the center in the radial direction of the wheel housing section 26 and the two fitting tubular portions for worm 32, 33 separated from each other in the axial direction of the worm housing section 27. Especially, the one side rib 37 is arranged closer to the electric motor 17 than the other side rib 38, and in the gear housing 16, the one side rib 37 has an important function of ensuring rigidity for supporting the electric motor 17, which is a heavy object, and rigidity for suppressing motor vibration generated when driving the electric motor 17.

Example 2

Figure 7:
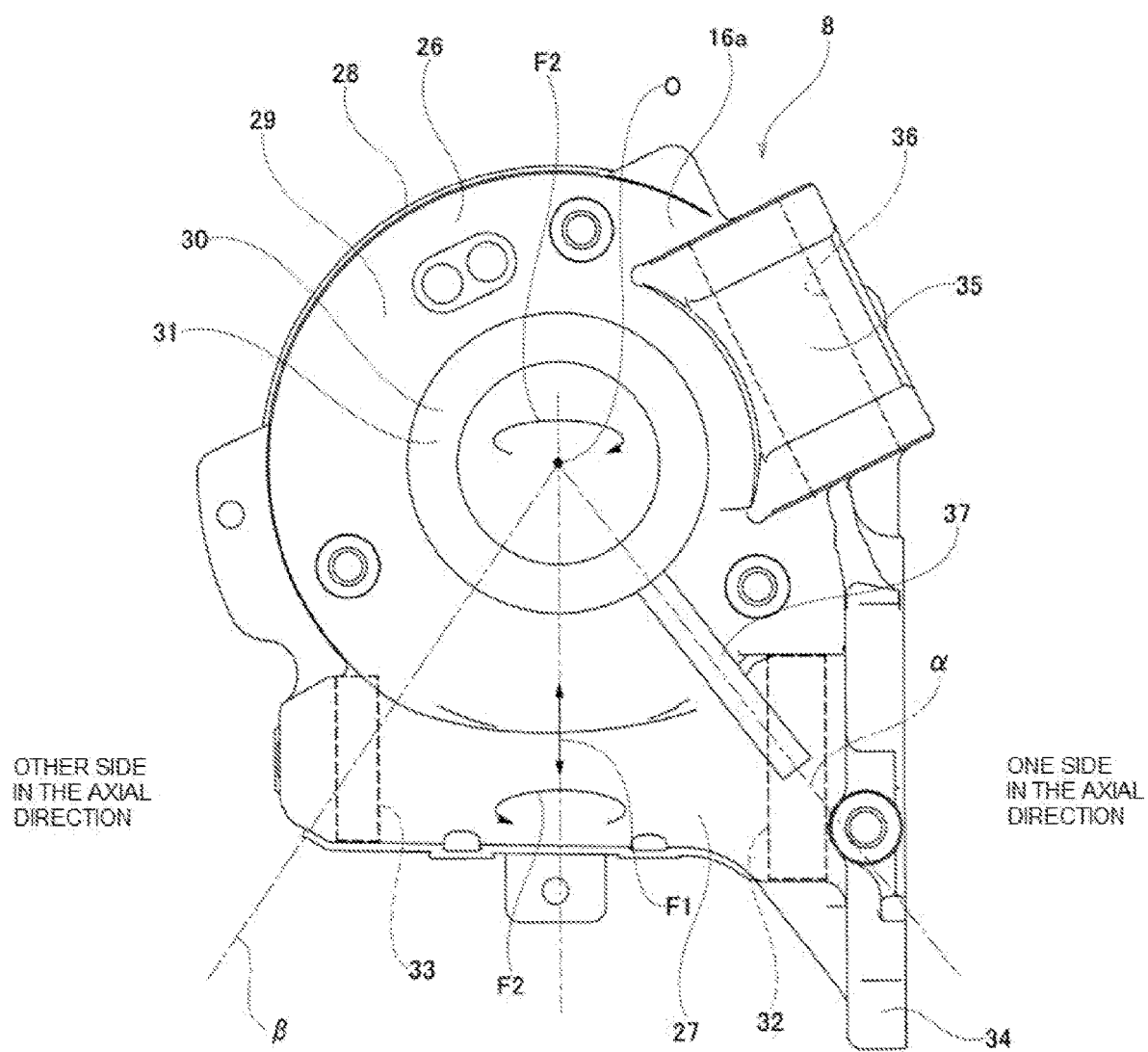
FIG. 7 a view corresponding to FIG. 4, illustrating a second example of an embodiment of the present disclosure.

FIG. 7 illustrates a second example of an embodiment of the present disclosure.

In this example, in comparison with the structure of the first example, the gear housing 16a includes only the one side rib 37 as a rib connecting the worm housing section 27 and the wheel housing section 26. In other words, in this example, the gear housing 16a does not include the other side rib 38 (see FIG. 4).

That is, the structure of this example includes only the one side rib 37 which has important functions of ensuring rigidity to support the electric motor 17, which is a heavy object, and rigidity to suppress motor vibration that is generated when driving the electric motor 17, so as to ensure rigidity of a portion of the gear housing 16a that is close to the electric motor 17, and the weight of the gear housing 16a is suppressed by omitting the other side rib 38. The other configurations and operational effects are the same as in the fifth example.

Example 3

Figure 8:
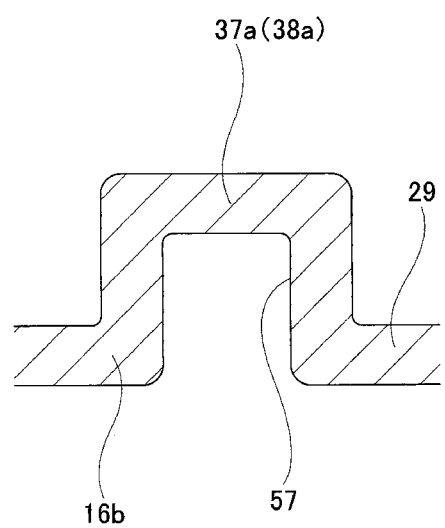
FIG. 8 is a view corresponding to FIG. 6, illustrating a third example of an embodiment of the present disclosure.

FIG. 8 illustrates a third example of an embodiment of the present disclosure.

In this example, the gear housing 16b has a groove 57 extending along the extension direction of the one side rib 37a and the other side rib 38a on the back-surface side of these ribs 37a, 38a. In this example, the groove 57 configure these ribs 37a, 38a hollow. According to the structure of this example, the gear housing 16b can be configured lighter than the structure of the first example. The other configurations and operational effects are the same as in the first example.

Example 4

Figure 9:
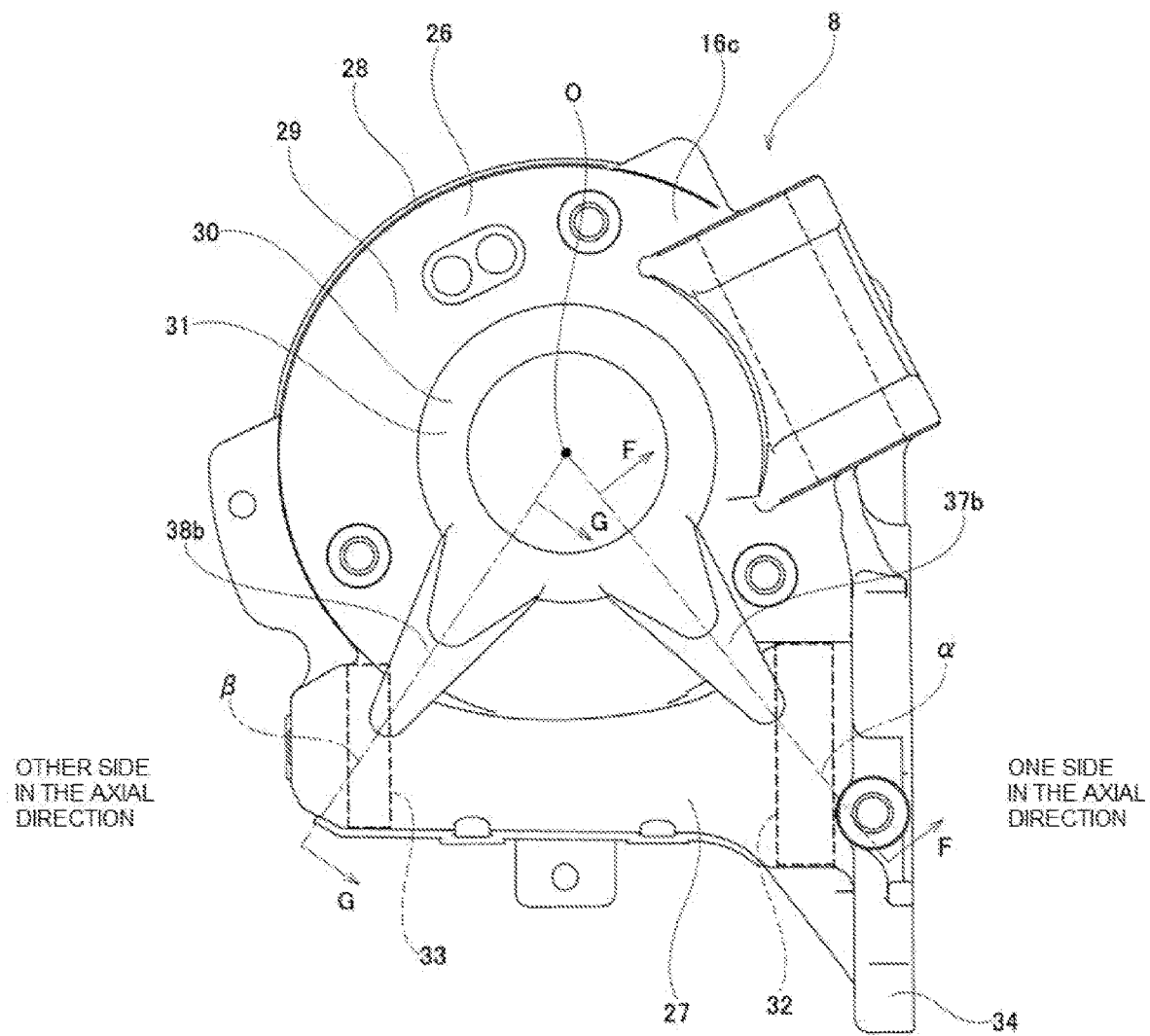
FIG. 9 is a view corresponding to FIG. 4, illustrating a fourth example of an embodiment of the present disclosure.
Figure 10:
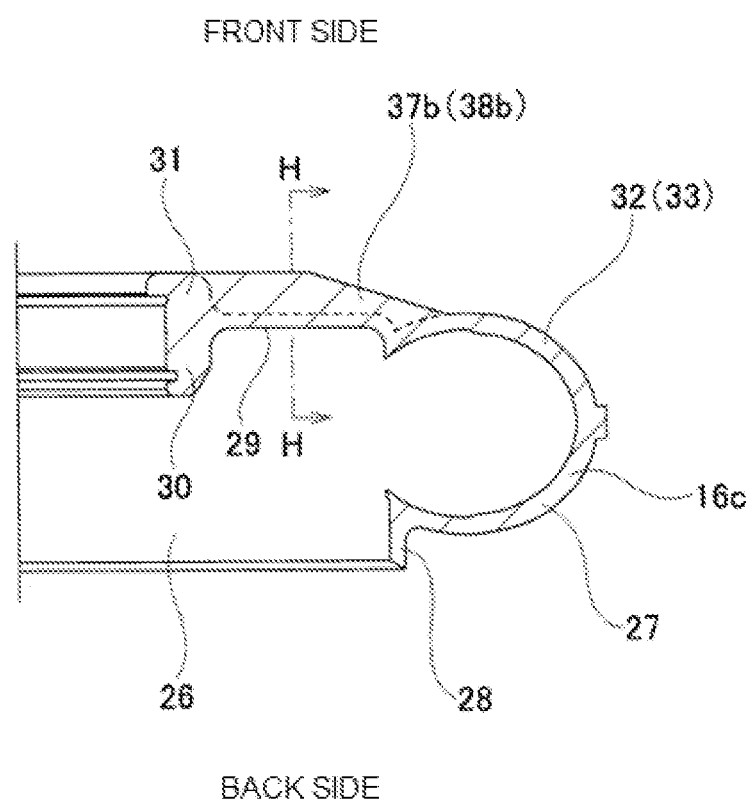
FIG. 10 is a cross-sectional view of section F-F and section G-G in FIG. 9.
Figure 11:
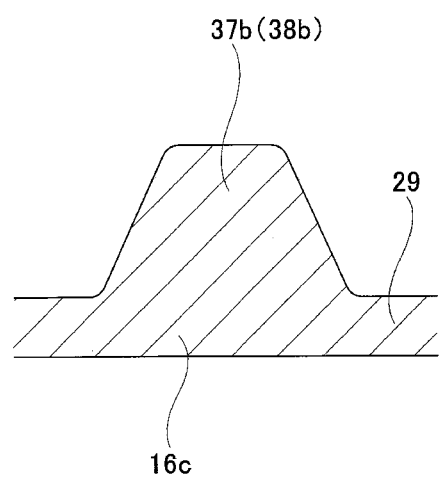
FIG. 11 is a cross-sectional view of section H-H in FIG. 10.
Figure 12:
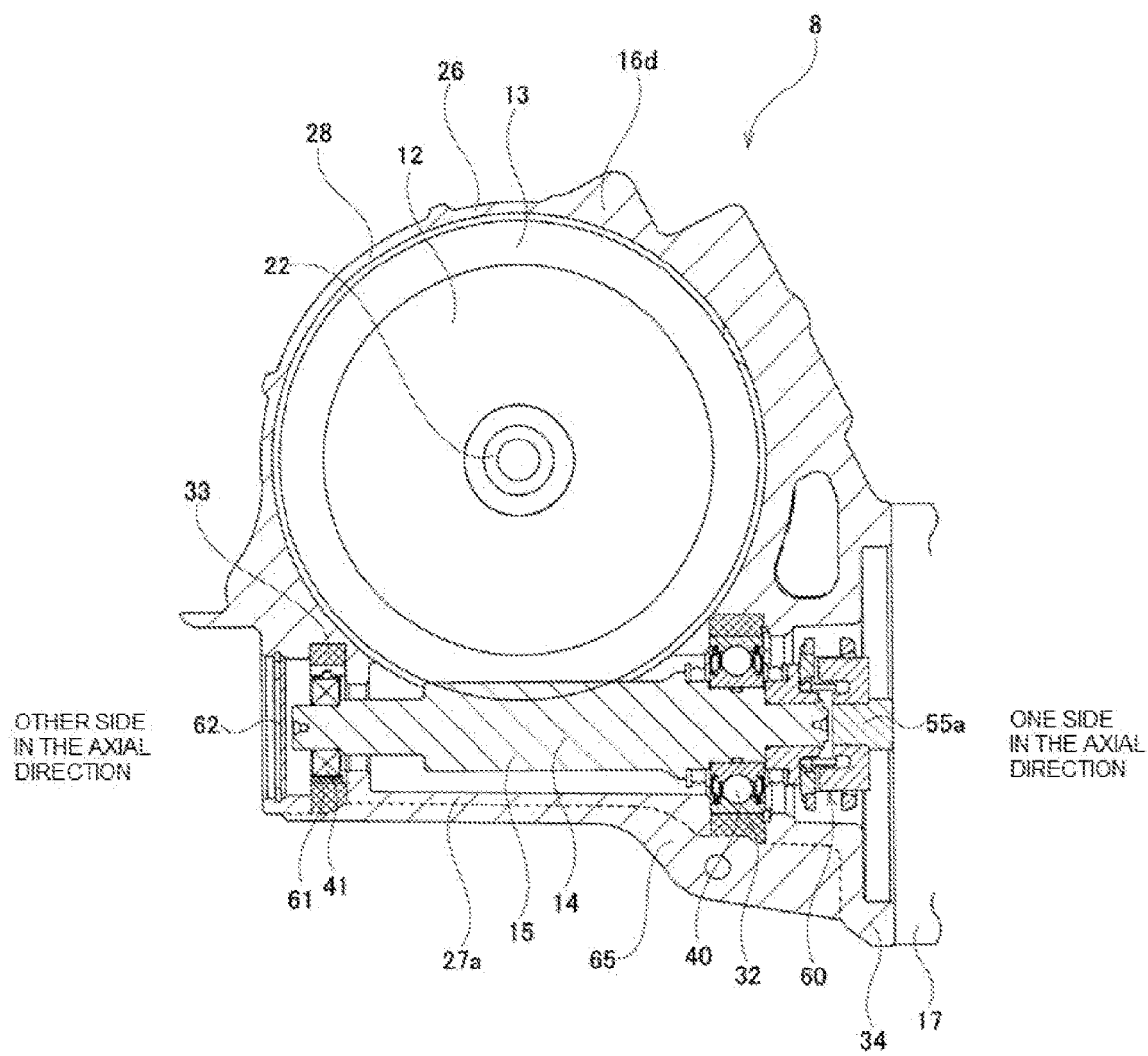
FIG. 12 is a view corresponding to FIG. 3, illustrating a fifth example of an embodiment of the present disclosure.

FIG. 9 to FIG. 11 illustrate a fourth example of an embodiment of the present disclosure.

In this example, as illustrated in FIG. 9, the width dimension in the circumferential direction of each of the one side rib 37b and the other side rib 38b becomes smaller toward the outer side in the radial direction. In a case of implementing a configuration of the present disclosure, the width dimension in the circumferential direction of each of the one side rib and the other side rib may be constant at a portion on the inner side in the radial direction, and may be reduced toward the outer side in the radial direction at a portion on the outer side in the radial direction.

In this example, the cross-sectional shape of each of the one side rib 37b and the other side rib 38b is a solid trapezoid as illustrated in FIG. 11.

In this example, as illustrated in FIG. 10, the amount of protrusion toward the front side of each of the one side rib 37b and the other side rib 38b is constant at the portion on the inner side in the radial direction, and decreases toward the outer side in the radial direction at the portion on the outer side in the radial direction. In a case of implementing a configuration of the present disclosure, the amount of protrusion of each of the one side rib and the other side rib toward the front side may also be reduced toward the outer side in the radial direction overall.

In the structure of this example, the rigidity of the gear housing 16c can be adjusted not only by adjusting the overall length in the radial direction and the width dimension in the circumferential direction of each of the one side rib 37b and the other side rib 38b, but also by adjusting the rate of change of the width dimension in the circumferential direction with regard to the radial direction, the ratio of the length of the lower base to the length of the upper base of the trapezoidal cross-sectional shape, and the rate of change in the amount of protrusion toward the front side in the radial direction. The other configurations and operational effects are the same as in the first example.

Example 5

FIG. 12 to FIG. 15 illustrate a fifth example of an embodiment of the present disclosure.

In the structure of this example, the end portion on the one side in the axial direction of the worm 14 is supported by a ball bearing 40 so as to rotate and pivotally displace with respect to the fitting tubular portion for worm 32 on the one side in the axial direction of the worm housing section 27a. The end portion on the one side in the axial direction of the worm 14 is connected to the tip end portion of the output shaft 55a of the electric motor 17 using a coupling 60 so as to transmit torque and pivotally displace. The ball bearing 41 externally fitted onto the end portion on the other side in the axial direction of the worm 14 is internally fitted into the fitting tubular portion for worm 33 on the other side in the axial direction of the worm housing section 27a so as to move toward and away from the worm wheel 12 (in vertical direction in FIG. 12).

The structure of this example includes an elastic biasing member 61 such as a leaf spring assembled between the fitting tubular portion for worm 33 on the other side in the axial direction and the ball bearing 41. The elastic biasing member 61 elastically biases the worm 14 toward the side of the worm wheel 12 through the ball bearing 41. As a result, backlash between the wheel teeth 13 and the worm teeth 15 is suppressed, suppressing chattering generated when the direction of rotation of the worm 14 is reversed.

In the structure of this example, the worm housing section 27a of the gear housing 16d has a tubular shape with an end portion on the one side in the axial direction and an end portion on the other side in the axial direction open. In the structure of this example, since the end portion on the other side in the axial direction of the worm housing section 27a is open, work such as assembling the elastic biasing member 61 can be easily performed through this opening. In the assembled state of the electric assist device 8, the opening on the other side in the axial direction of the worm housing section 27a is closed by a lid 62 attached to the opening.

Since the worm housing section 27a of this example has a structure in which the end portion on the other side in the axial direction is open, the rigidity of the end portion on the other side in the axial direction tends to be lower compared to the worm housing section 27 of the first example in which the end portion on the other side in the axial direction is not open.

Therefore, in this example, in order to ensure the rigidity of the end portion on the other side in the axial direction of the worm housing section 27a, in other words, to compensate for the rigidity, a reinforcement level of the end portion on the other side in the axial direction of the worm housing section 27a by the other side rib 38c is made higher than a reinforcement level of the end portion on the one side in the axial direction of the worm housing section 27a by the one side rib 37c.

Specifically, the width dimension in the circumferential direction of the other side rib 38c is made larger than the width dimension in the circumferential direction of the one side rib 37c. In this way, by making the rigidity of the other side rib 38c greater than the rigidity of the one side rib 37c, the rigidity of the end portion on the other side in the axial direction of the worm housing section 27a is efficiently ensured.

Figure 14:
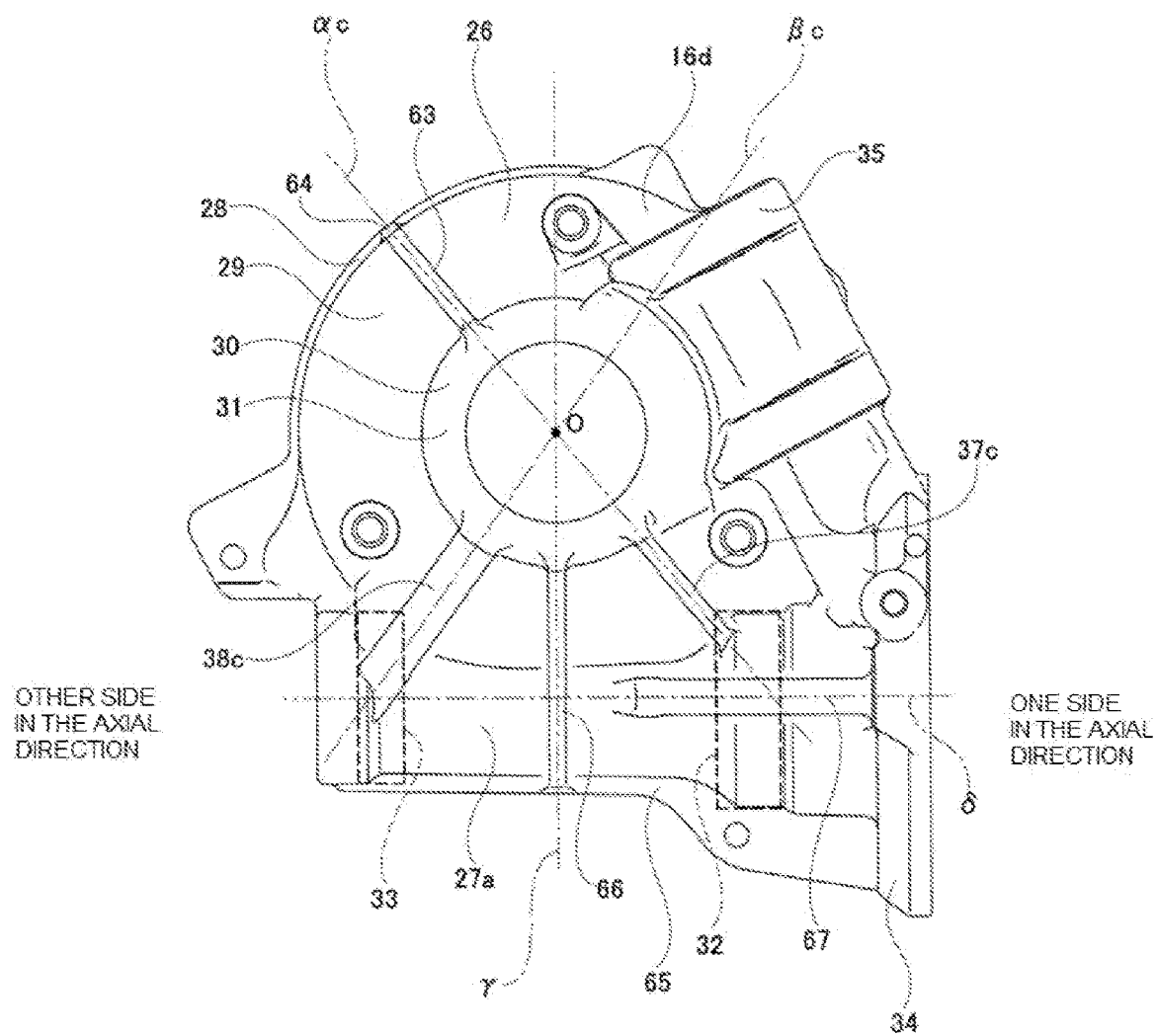
FIG. 14 is a view corresponding to FIG. 4, illustrating the fifth example.
Figure 15:
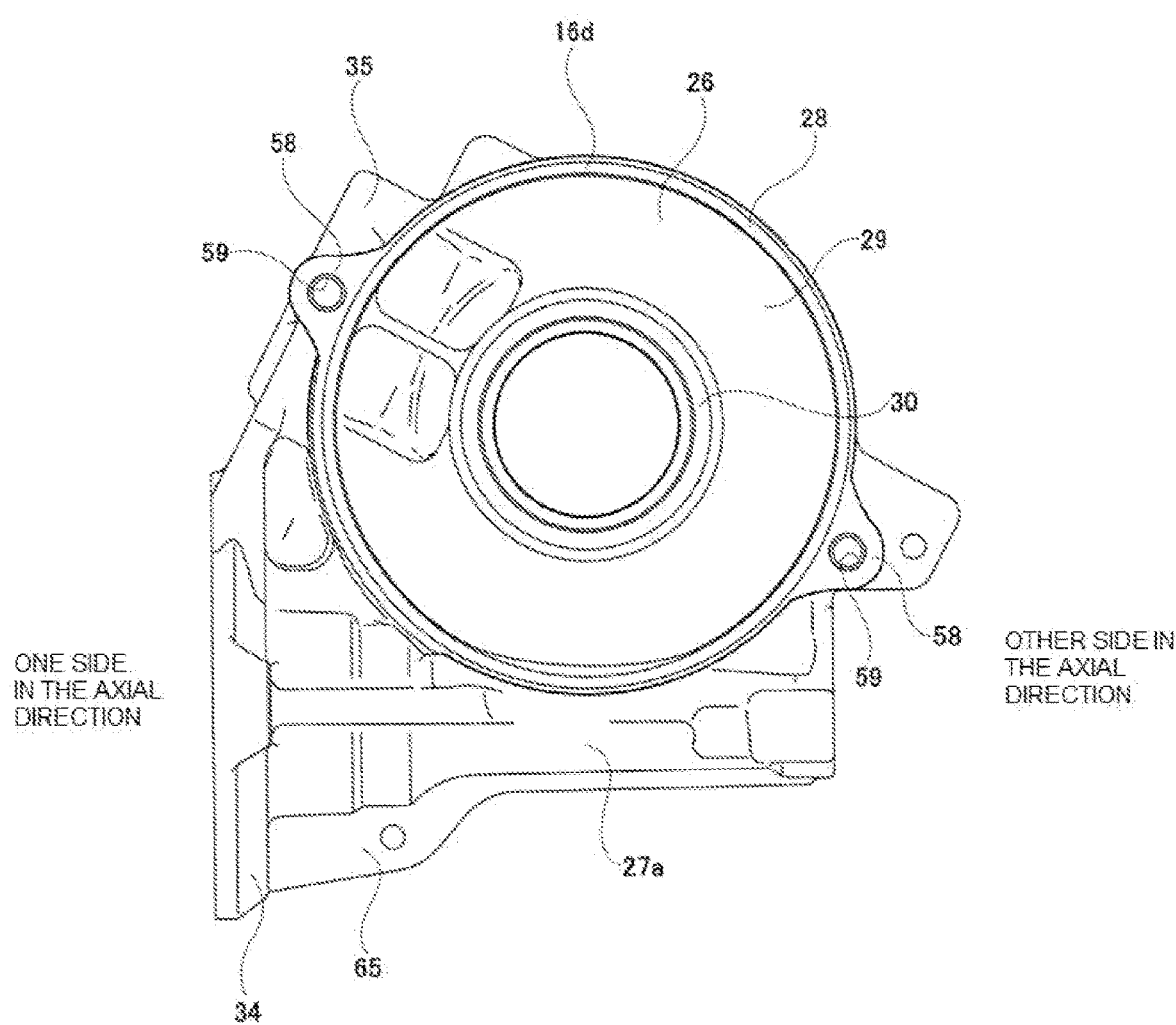
FIG. 15 is a view of the gear housing of the fifth example as viewed from the rear side in the axial direction.

Further, the end portion on the outer side in the radial direction of the other side rib 38c is located farther from the fitting tubular portion for wheel 30 (lower side in FIG. 4) than the end portion on the outer side in the radial direction of the one side rib 37c in a direction orthogonal to the axial direction of the worm housing section 27a (vertical direction in FIG. 14). In this way, the connection length of the end portion on the outer side in the radial direction of the other side rib 38c to the end portion on the other side in the axial direction of the worm housing section 27a is ensured to be longer than the connection length of the end portion on the outer side in the radial direction of the one side rib 37c to the end portion on the one side in the axial direction of the worm housing section 27a, so that the rigidity of the end portion on the other side in the axial direction of the worm housing section 27a is efficiently ensured.

In a case of implementing a configuration of the present disclosure, it is also possible to adopt only one of the configuration of increasing the width dimension in the circumferential direction of the other side rib 38c than the width dimension in the circumferential direction of the one side rib 37c and the configuration of locating the end portion on the outer side in the radial direction of the other side rib 38c farther from the fitting tubular portion for wheel 30 than the end portion on the outer side in the radial direction of the one side rib 37c in the direction orthogonal to the axial direction of the worm housing section 27a.

Figure 13:
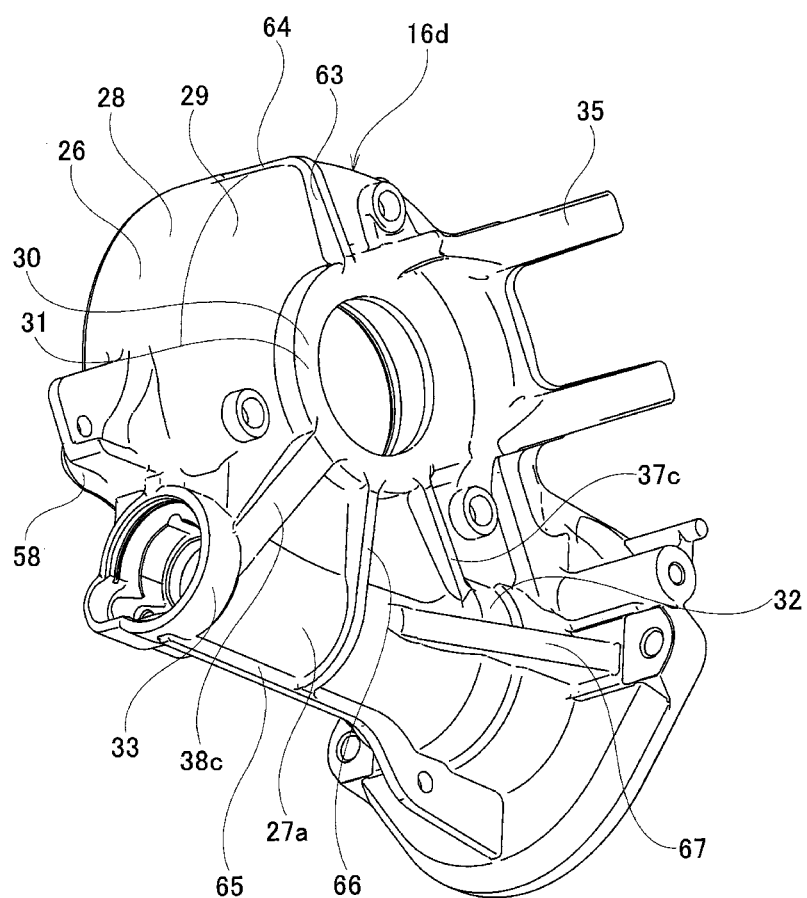
FIG. 13 is a perspective view of the gear housing of the fifth example.

In this example, as illustrated in FIG. 13, optionally and additionally, the overall amount of protrusion toward the front side of each of the one side rib 37c and the other side rib 38c is reduced toward the outer side in the radial direction, in other words, it is increased toward the inner side in the radial direction. As a result, in this example, the volume of each of the one side rib 37c and the other side rib 38c increases toward the inner side in the radial direction. Due to this, when performing injection molding or die casting of the gear housing 16d, the fluidity of material from the outer side in the radial direction to the inner side in the radial direction can be improved in each molding space of the one side rib 37c and the other side rib 38c.

In this example, optionally and additionally, the gear housing 16d further includes an opposite side rib 63. The opposite side rib 63 protrudes from the side surface on the front side of the bottom portion for wheel 29. In the bottom portion for wheel 29, as illustrated in FIG. 14, the opposite side rib 63 is arranged on the opposite side in the radial direction with respect to the one side rib 37c. The opposite side rib 63 extends in the radial direction centered on the center axis O of the bottom portion for wheel 29. In this example, as illustrated in FIG. 14, the opposite side rib 63 is arranged on a center axis line αc of the one side rib 37c when viewed from the front side of the bottom portion for wheel 29. In other words, in this example, the opposite side rib 63 extends in a direction of the center axis line αc, that is, in the same direction as the one side rib 37c. The end portion on the inner side in the radial direction of the opposite side rib 63 is connected to the outer circumferential surface of the annular rib 31. The end portion on the outer side in the radial direction of the opposite side rib 63 is located at the end portion on the outer side in the radial direction of the bottom portion for wheel 29. In this example, by providing the opposite side rib 63, the rigidity of the wheel housing section 26 is efficiently ensured.

This example further includes, optionally and additionally, an extension rib 64 that protrudes from the outer circumferential surface of the tubular portion for wheel 28 and extends from the end portion on the outer side in the radial direction of the opposite side rib 63 toward the rear side in the axial direction of the tubular portion for wheel 28. In this example, the end portion on the rear side of the extension rib 64 is located at the end portion on the rear side of the tubular portion for wheel 28. In this example, by providing the extension rib 64, the rigidity of the wheel housing section 26 is efficiently ensured.

In this example, optionally and additionally, a hinge portion 35 is provided in the bottom portion for wheel 29 at a portion located on the opposite side in the radial direction with respires to the other side rib 38c. As a result, the rigidity of the portion located on the opposite side in the radial direction can be ensured by the hinge portion 35. In a case of implementing a configuration of the present disclosure, when the hinge portion exists at a position in the circumferential direction that is different from this example, the rib on the opposite side that protrudes from the side surface on the front side of the bottom portion for wheel 29 may be arranged on the opposite side in the radial direction with respect to the other side rib 38c. Also in this case, it is possible to provide an extension rib that protrudes from the outer circumferential surface of the tubular portion for wheel 28 and extends from the end portion on the outer side in the radial direction of the rib on the opposite side toward the rear side in the axial direction of the tubular portion for wheel 28.

In this example, the gear housing 16d optionally and additionally includes a first rib 65. The first rib 65 protrudes from an end portion of the outer circumferential surface of the worm housing section 27a that is far from the wheel housing section 26 (lower side in FIG. 14) and extends in the axial direction of the worm housing section 27a. In this example, the first rib 65 is arranged over the entire length of the worm housing section 27a in the axial direction. The end portion on the one side in the axial direction of the first rib 65 is connected to the side surface on the other side in the axial direction of the motor mounting flange 34. In this example, by providing the first rib 65, the rigidity of the worm housing section 27a is efficiently ensured.

In this example, the gear housing 16d optionally and additionally includes a second rib 66. The second rib 66 protrudes from the side surface on the front side of the bottom portion for wheel 29 and the side surface on the front side of the worm housing section 27a, and connects the fitting tubular portion for wheel 30 and the first rib 65. In this example, the second rib 66 is arranged on a straight line γ that passes through the center axis O of the bottom portion for wheel 29 and is orthogonal to the center axis of the worm housing section 27a when viewed from the front side of the bottom portion for wheel 29. The end portion on the inner side in the radial direction of the second rib 66 is connected to the outer circumferential surface of the annular rib 31. The end portion on the outer side in the radial direction of the second rib 66 is connected to an intermediate portion in the extension direction of the first rib 65. In this example, by providing the second rib 66, the rigidity of the gear housing 16d is efficiently ensured.

In this example, optionally and additionally, the gear housing 16d further includes a third rib 67. The third rib 67 extends from the end portion on the front side of the outer circumferential surface of the worm housing section 27a and extends in the axial direction of the worm housing section 27a. In this example, the third rib 67 is arranged in a portion on the one side in the axial direction of the worm housing section 27a. The end portion on the one side in the axial direction of the third rib 67 is connected to the side surface on the other side in the axial direction of the motor mounting flange 34. The end portion on the other side in the axial direction of the third rib 67 is located between the end portion on the outer side in the radial direction of the one side rib 37c and the end portion on the outer side in the radial direction of the other side rib 38c in the axial direction of the worm housing section 27a, more specifically, between the end portion on the outer side in the radial direction of the one side rib 37c and the second rib 66. Further, as illustrated in FIG. 14, the center axis line αc of the one side rib 37c intersects with the third rib 67 when viewed from the front side of the bottom portion for wheel 29. In this example, by providing the third rib 67, the rigidity of the worm housing section 27a is efficiently ensured. Further, in this example, as illustrated in FIG. 14, the center axis line δ of the third rib 67 intersects with the center axis line βc of the other side rib 38c when viewed from the front side of the bottom portion for wheel 29. Further, when viewed from the front side of the bottom portion for wheel 29, the intersection of the center axis line δ of the third rib 67 and the center axis line βc of the other side rib 38c overlaps with the fitting tubular portion for worm 33. By employing such a configuration, the rigidity of the worm housing section 27a is more efficiently ensured. The other configurations and operational effects are the same as in the first example.

Although this example includes all optional and additional elements, in a case of implementing a configuration of the present disclosure, it is also possible to selectively employ one or more of these optional and additional elements.

Example 6

Figure 16:
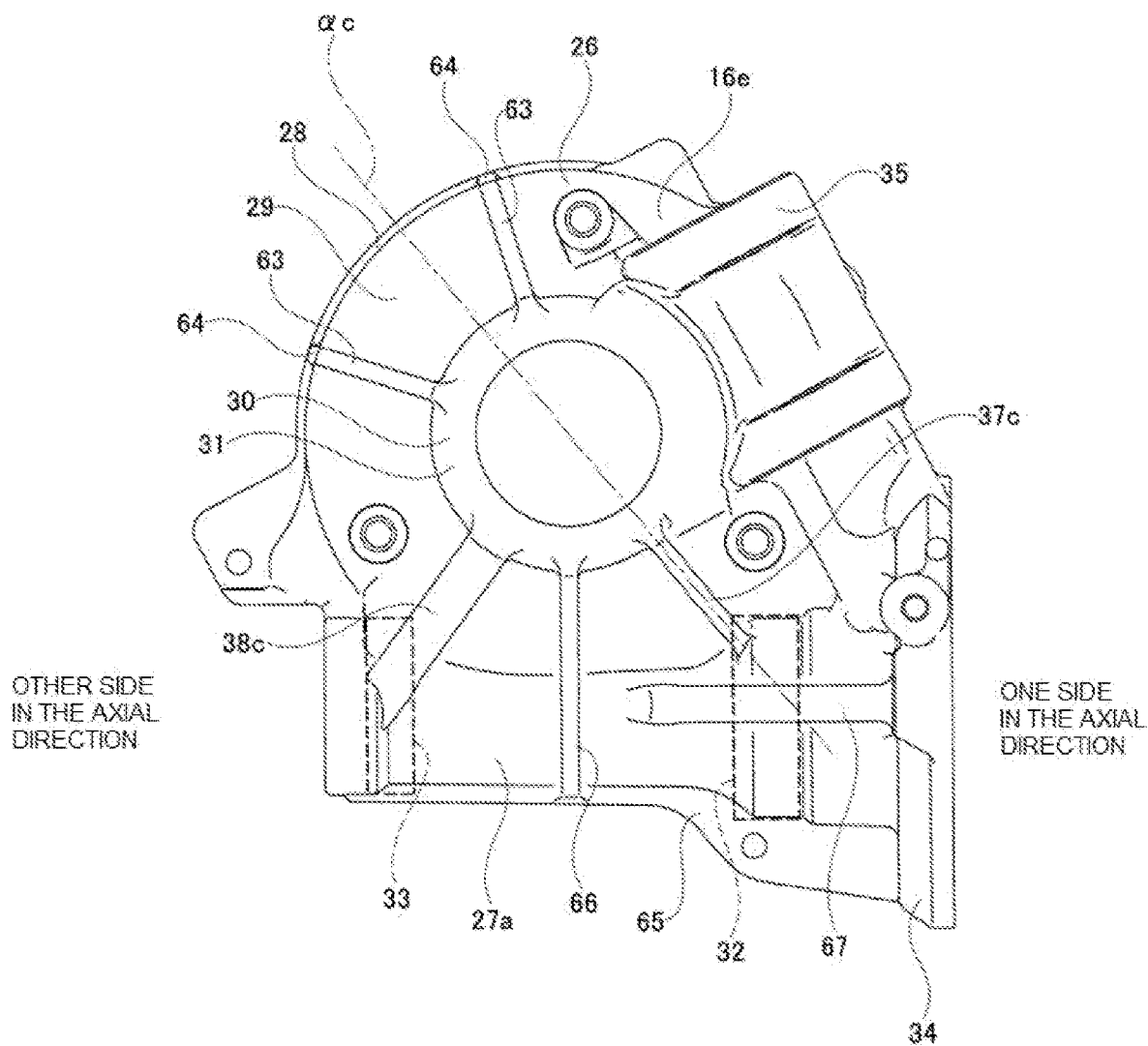
FIG. 16 is a view corresponding to FIG. 4, illustrating a sixth example of an embodiment of the present disclosure.

FIG. 16 illustrates a sixth example of an embodiment of the present disclosure.

In the gear housing 16e of this example, opposite side ribs 63 are arranged at two locations on the opposite side in the radial direction from the one side rib 37c that are separated on both sides in the circumferential direction from the center axis line αc of the one side rib 37c. In the illustrated example, although the two opposite side ribs 63 are arranged asymmetrically with respect to the center axis line αc, the two opposite side ribs 63 can also be arranged symmetrically with respect to the center axis line αc. In the case of this example as well, the rigidity of the wheel housing section 26 is efficiently ensured by providing these opposite side ribs 63. The other configurations and operational effects are the same as in the fifth example.

Example 7

Figure 17:
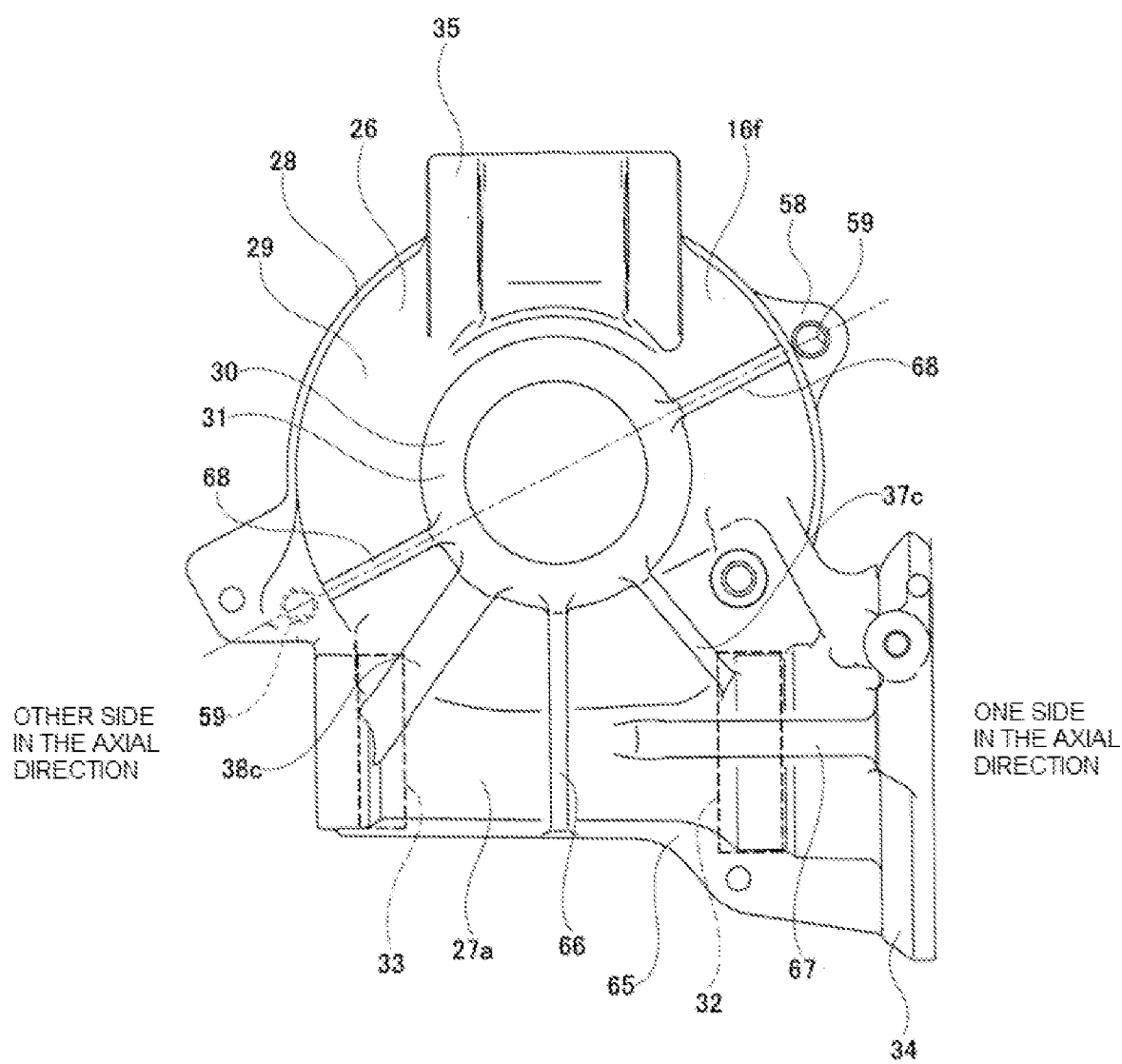
FIG. 17 is a view corresponding to FIG. 4, illustrating a seventh example of an embodiment of the present disclosure.

FIG. 17 illustrates a seventh example of an embodiment of the present disclosure.

In the gear housing 16f of this example, the hinge portion 35 is arranged at a position in the circumferential direction opposite to the worm housing section 27a in the radial direction.

In this example, the gear housing 16f has fourth ribs 68 that each protrude from the side surface on the front side of the bottom portion for wheel 29 and are arranged at the same position in the circumferential direction as the bolt hole 59. Each of the fourth ribs 68 extends in a radial direction centered on the center axis O of the bottom portion for wheel 29. The end portion on the inner side in the radial direction of each of the fourth rib 68 is connected to the outer circumferential surface of the annular rib 31. The end portion on the outer side in the radial direction of each of the fourth rib 68 is located at the end portion on the outer side in the radial direction of the bottom portion for wheel 29. In this example, the rigidity of the wheel housing section 26 is efficiently ensured by providing these fourth ribs 68. The other configurations and operational effects are the same as in the fifth example.

The structure of the present disclosure may be implemented by appropriately combining the structures of the respective embodiments described above to the extent that no contradiction occurs.

REFERENCE SIGNS LIST

1 Electric power steering device
2 Steering wheel
3 Steering shaft
4 Steering column
5a, 5b Universal joint
6 Intermediate shaft
7 Steering gear unit
8 Electric assist device
9 Pinion shaft
10 Tie rod
11 Tilt shaft
12 Worm wheel
13 Wheel teeth
14 Worm
15 Worm teeth
16, 16a, 16b, 16c, 16d, 16e, 16f Gear housing
17 Electric motor
18 Sensor housing
19 Housing
20 Bolt
21 Torsion bar
22 Output shaft
23 Ball bearing
24 Ball bearing
25 Torque sensor
26 Wheel housing section
27, 27a Worm housing section
28 Tubular portion for wheel
29 Bottom portion for wheel
30 Fitting tubular portion for wheel
31 Annular rib
32 Fitting tubular portion for worm
33 Fitting tubular portion for worm
34 Motor mounting flange
35 Hinge portion
36 Insertion hole 37, 37a, 37b, 37c One side rib
38, 38a, 38b, 38c Other side rib
39 Female spline
40 Ball bearing
41 Ball bearing
42 Outer ring
43 Inner ring
44 Balls
45 Outer ring
46 Inner ring
47 Balls
48 Bearing holder
49 Outer ring
50 Inner ring
51 Balls
52 Outer ring
53 Inner ring
54 Balls
55, 55a Output shaft
56 Male spline
57 Groove
58 Coupling flange
59 Bolt hole
60 Coupling
61 Elastic biasing member
62 Lid
63 Opposite side rib
64 Extension rib
65 First rib
66 Second rib
67 Third rib
68 Fourth rib

The invention claimed is:

1. A gear housing including
a wheel housing section that accommodates a worm wheel inside, and a worm housing section that accommodates a worm inside,
the wheel housing section having a tubular portion for wheel arranged around the worm wheel, a circular bottom portion for wheel extending from an end portion of the tubular portion for wheel on one side in an axial direction of the wheel housing section toward an inner side in a radial direction, and a fitting tubular portion for wheel connected to an end portion on the inner side in the radial direction of the bottom portion for wheel and into which a bearing for wheel for supporting the worm wheel is internally fitted,
the worm housing section having a tubular shape with at least an end portion on one side in an axial direction of the worm housing section is open, having a center axis arranged at a skewed position with respect to a center axis of the wheel housing section, and connected to a portion in a circumferential direction of an end portion on an outer side in the radial direction of the wheel housing section, and,
the worm housing section having fitting tubular portions for worm into which a bearing for worm for supporting the worm or a bearing holder holding the bearing for worm is internally fitted respectively at two locations separated in the axial direction of the worm housing section, wherein
the gear housing includes:
a one side rib that protrudes from a side surface of the bottom portion for wheel on the one side in the axial direction of the wheel housing section and connects the fitting tubular portion for wheel and a fitting tubular portion for worm on the one side in the axial direction of the worm housing section of the fitting tubular portions for worm at two locations, and
an other side rib that protrudes from a side surface of the bottom portion for wheel on the one side in the axial direction of the wheel housing section and connects the fitting tubular portion for wheel and a fitting tubular portion for worm on the other side in the axial direction of the worm housing section of the fitting tubular portion for worm at the two locations.

2. The gear housing according to claim 1, wherein the one side rib extends in a radial direction centered on a center axis of the bottom portion for wheel.

3. The gear housing according to claim 2, wherein the one side rib is arranged on a straight line connecting the center axis of the bottom portion for wheel and a center point of the fitting tubular portion for worm on the one side in the axial direction of the worm housing section when viewed from the one side in the axial direction of the wheel housing section.

4. The gear housing according to claim 1, wherein the other side rib extends in the radial direction centered on the center axis of the bottom portion for wheel.

5. The gear housing according to claim 4, wherein the other side rib is arranged on a straight line connecting the center axis of the bottom portion for wheel and a center point of the fitting tubular portion for worm on the other side in the axial direction of the worm housing section when viewed from the one side in the axial direction of the bottom portion for wheel.

6. The gear housing according to claim 1, wherein an end portion on the other side in the axial direction of the worm housing section is also open and a width dimension in the circumferential direction of the other side rib is larger than a width dimension in the circumferential direction of the one side rib.

7. The gear housing according to claim 1, wherein an end portion on the other side in the axial direction of the worm housing section is also open, and an end portion on the outer side in the radial direction of the other side rib is located farther from the fitting tubular portion for wheel than an end portion on the outer side in the radial direction of the one side rib in a direction orthogonal to the axial direction of the worm housing section.

8. The electric assist device including
a worm wheel having wheel teeth on an outer circumferential surface,
a worm having worm teeth on an outer circumferential surface that meshes with the wheel teeth,
the gear housing according to claim 1 that accommodates the worm wheel and the worm inside
an electric motor supported by the gear housing and rotationally driving the worm.

* * * * *